United States Patent [19]

Bromley

[11] Patent Number: 4,954,023
[45] Date of Patent: Sep. 4, 1990

[54] INTERNAL CUTTING HEAD FOR DRIFTING PIPE

[75] Inventor: Scott Bromley, Lovington, N. Mex.

[73] Assignee: Scott Tech International, Inc., Lovington, N. Mex.

[21] Appl. No.: 413,540

[22] Filed: Sep. 27, 1989

[51] Int. Cl.⁵ .............................................. B23B 47/00
[52] U.S. Cl. .................................... 408/1 R; 51/34 J; 51/290; 408/81; 408/103
[58] Field of Search .................... 408/1 R, 57, 59, 71, 408/77, 79, 80, 81, 82, 83, 103, 104, 113, 114; 409/143; 51/34 R, 34 C, 34 D, 34 H, 34 J, 245, 290, 349

[56] References Cited

U.S. PATENT DOCUMENTS

| | | | |
|---|---|---|---|
| 82,303 | 9/1968 | Fory | 408/77 |
| 1,830,524 | 11/1931 | Barnard | 72/76 |
| 2,306,670 | 12/1942 | Sutliff | 408/79 |
| 2,583,429 | 1/1952 | Johnson | 72/76 |
| 2,873,632 | 2/1959 | Bissey | 408/114 |
| 3,164,039 | 1/1965 | Woods | 408/82 |
| 3,348,434 | 10/1967 | Plummer | 408/83 |
| 3,911,707 | 10/1975 | Minakov et al. | 72/76 |
| 3,939,561 | 2/1976 | Nichols | 30/107 |
| 3,977,076 | 8/1976 | Vieira et al. | 30/103 |
| 4,084,484 | 4/1978 | Shklyanov et al. | 409/143 |
| 4,306,437 | 12/1981 | Javorik et al. | 72/75 |
| 4,369,573 | 1/1983 | Vitale | 30/105 |
| 4,424,629 | 1/1984 | Schott | 30/105 |
| 4,455,746 | 6/1984 | Idzik et al. | 30/106 |
| 4,571,129 | 2/1986 | Strand | 408/80 |
| 4,577,388 | 3/1986 | Wood | 29/558 |
| 4,798,246 | 1/1989 | Best | 166/311 |

FOREIGN PATENT DOCUMENTS 1405036  5/1965  France ................ 408/83

*Primary Examiner*—Daniel W. Howell
*Attorney, Agent, or Firm*—Marcus L. Bates

[57] ABSTRACT

A portable system for reworking the inside diameter of heavy oil field casing, and especially casing that has irregularities on the inner surface thereof that render the casing unsuitable for use in deep wells. A cutting head assembly is rotated as it is forced into the interior of a joint of casing. The cutting head assembly includes a mandrel which turns a special cutting device having a plurality of cutters of engaging and cutting the inner wall of the pipe as the entire cutterhead is forced to travel through the pipe. Alignment members attached to the mandrel on either side of the cutting device maintain the longitudinal axis of the cutters in proper alignment to produce the desired new pipe inside diameter. After the first half of the pipe is sized or trued, the joint of casing is reversed and the other half is cut to the same new desired inside diameter.

23 Claims, 6 Drawing Sheets

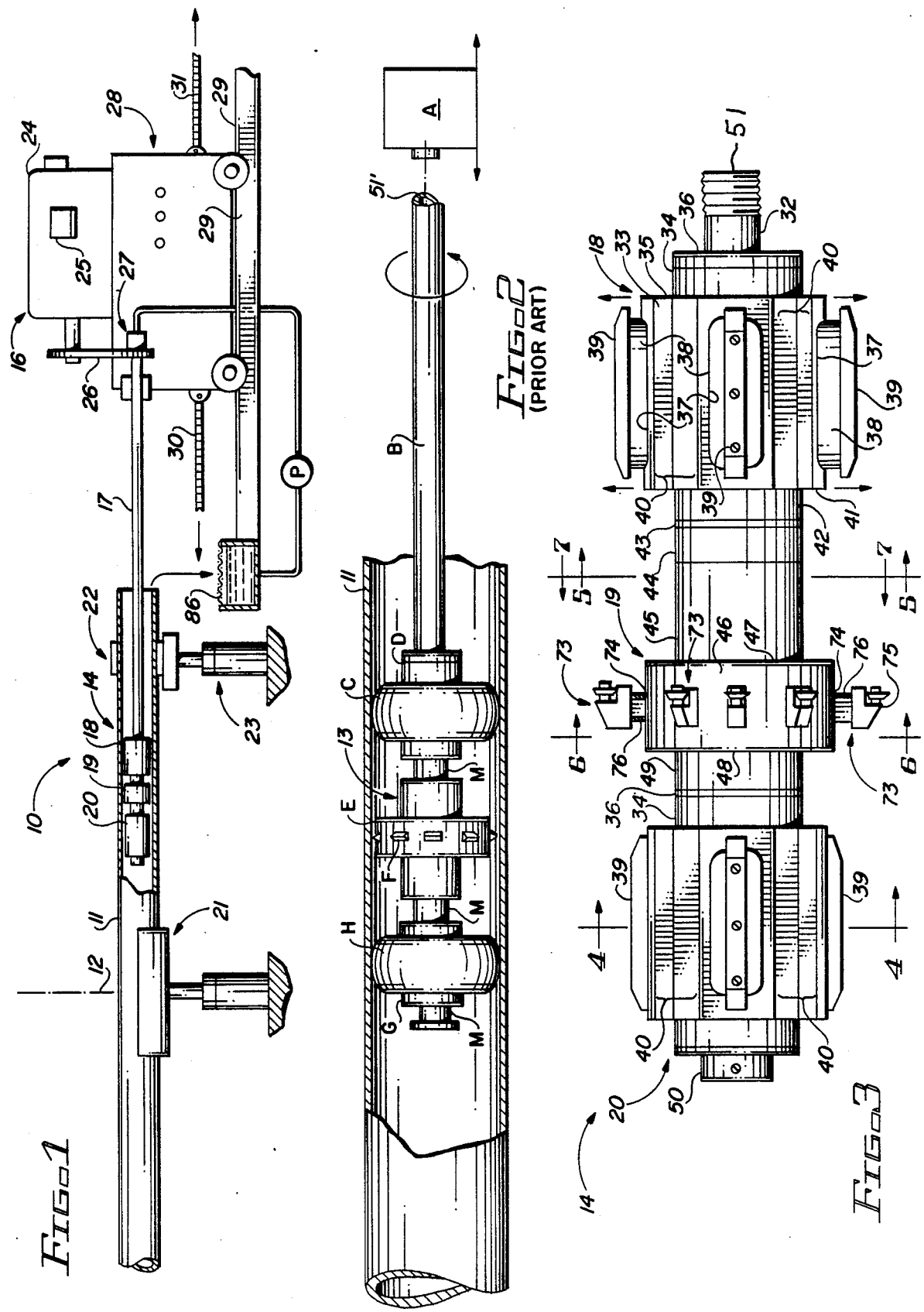

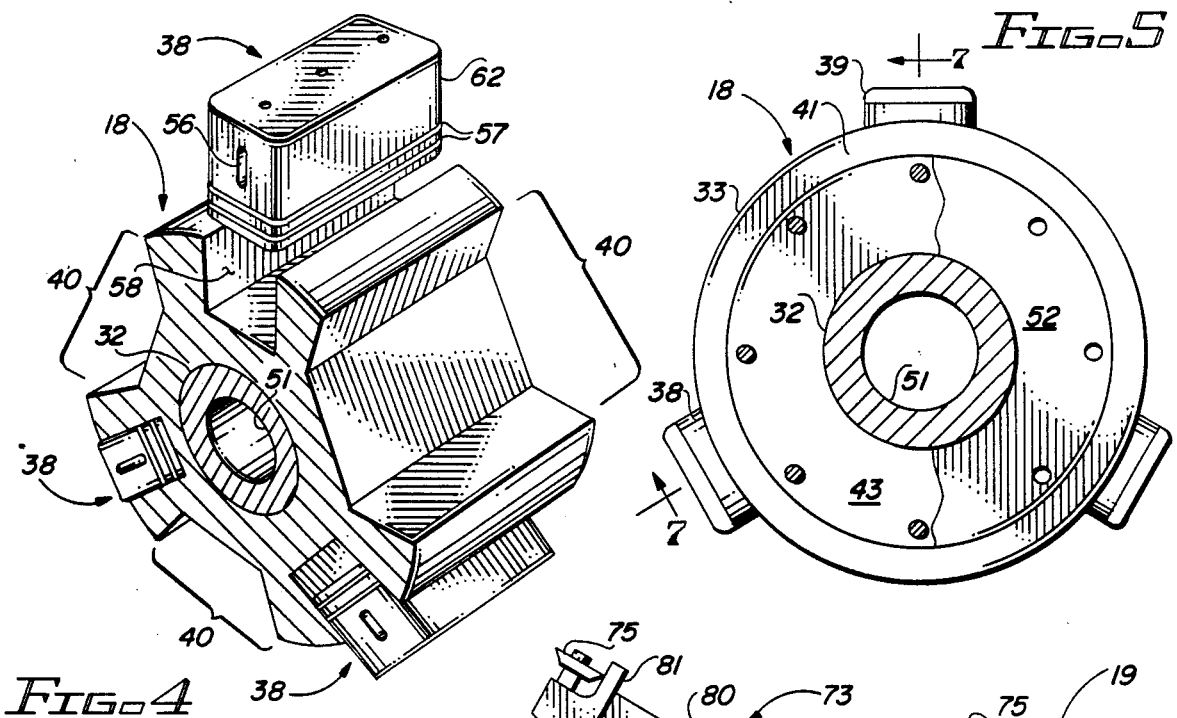
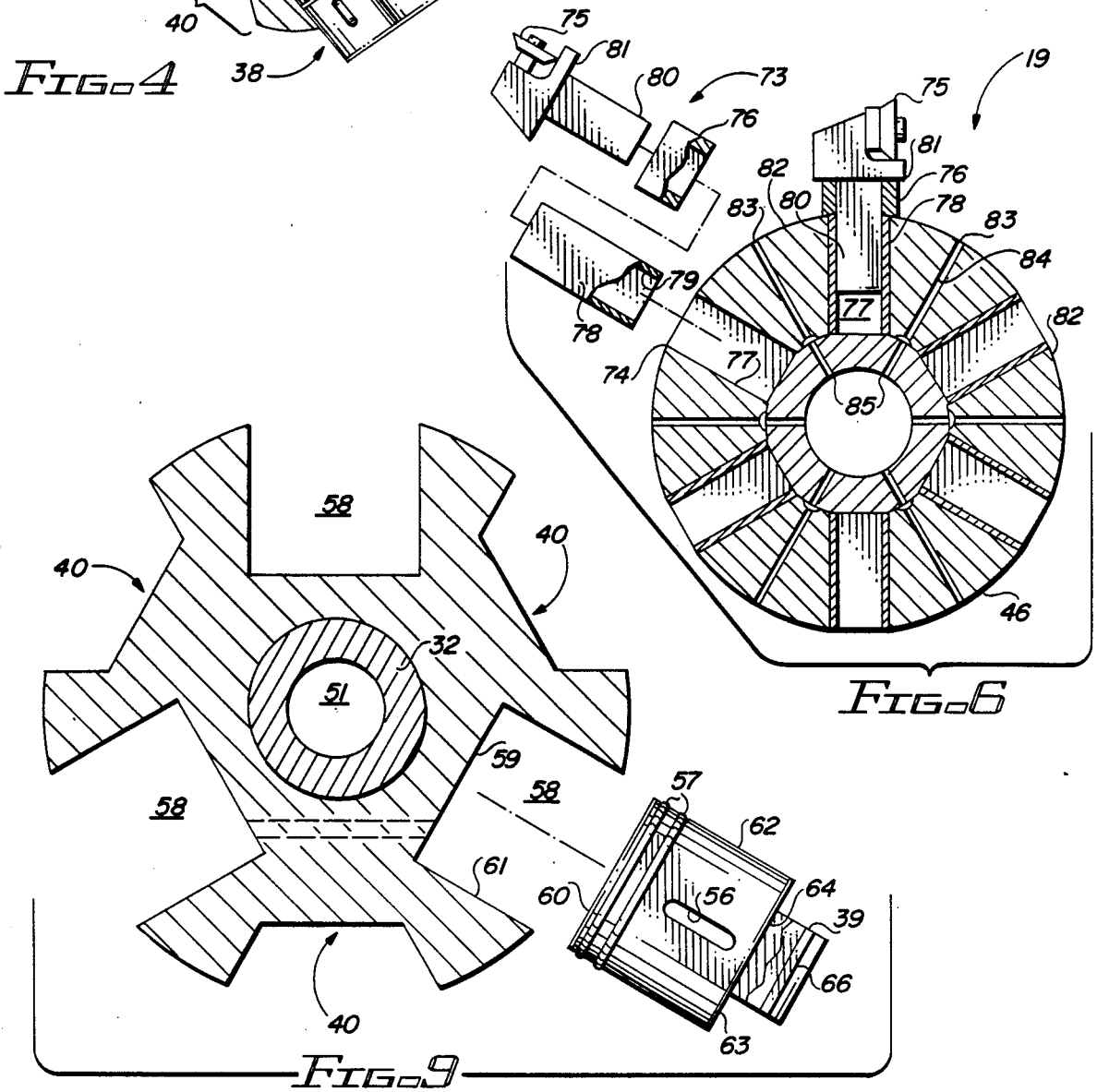

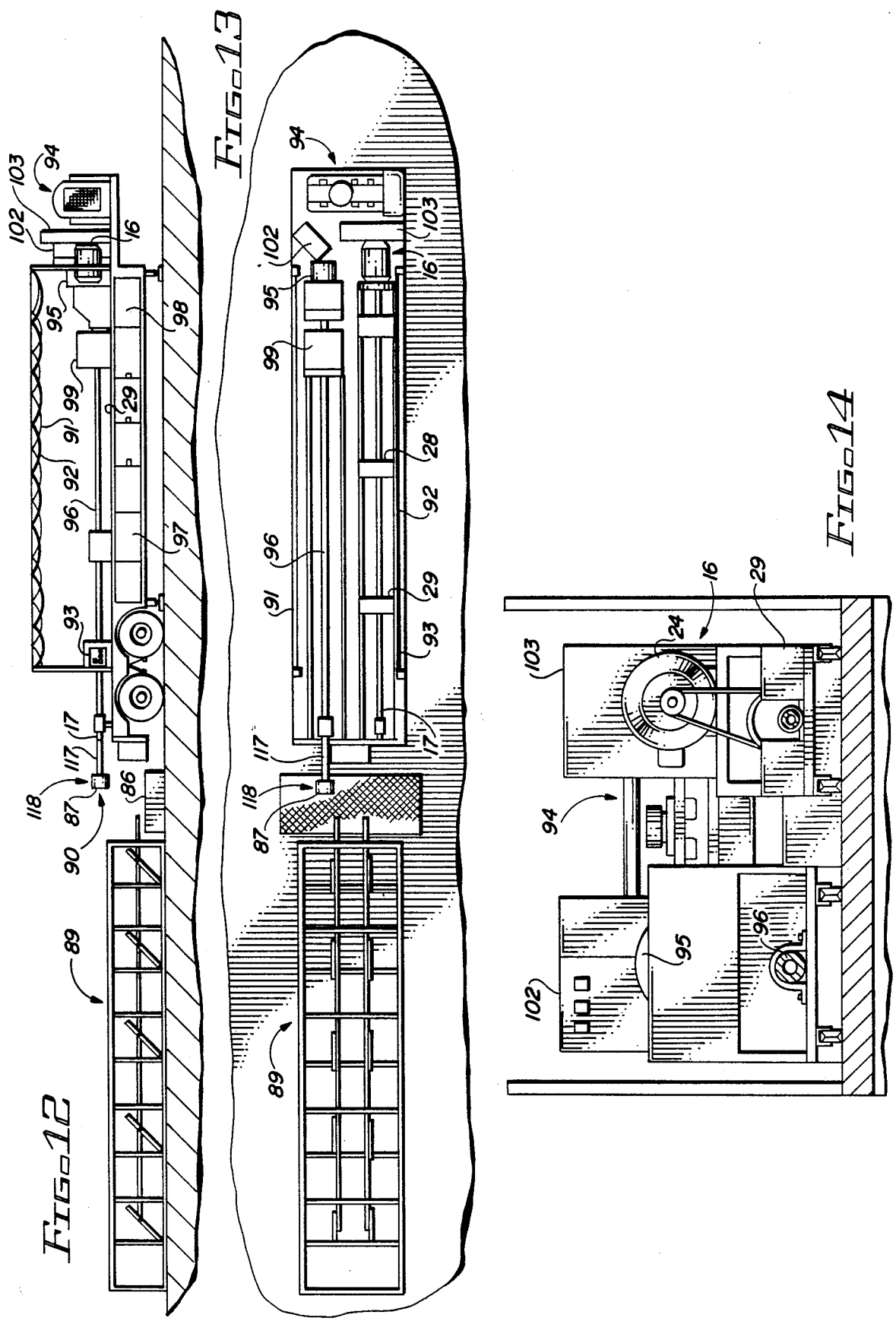

INTERNAL CUTTING HEAD FOR DRIFTING PIPE

BACKGROUND OF THE INVENTION

It is old to utilize centering devices to stabilize an internal pipe cutter, and to employ the cutter for internal parting of a pipe, especially downhole in a borehole. There seldom is any need to internally cut pipe merely to part the pipe into shorter joints because it is far easier to cut the pipe externally.

Applicant has discovered that it is possible to mount a special shaft driven cutter device onto a mandrel, support the cutter device fore and aft, thereby axially aligning the center of the cutter device respective to the longitudinal central axis of the pipe, and to internally cut the pipe surface with precision to provide the pipe with a uniform inside diameter in a manner somewhat similar to cutting the inner surface of a cylinder on a lathe, for example. However, it is difficult to properly support a cutting device internally of large, heavy pipe and to remove the inner surface of the pipe in order that the entire inner wall surface of the pipe is rendered of constant diameter.

In the oil field heavy, expensive, large outside diameter pipe, called casing, is cemented into position along the entire length of the borehole. Thus, the pipe is used for casing a borehole. For example, ten inch casing having a wall thickness approaching one-half inch is used downhole in boreholes having a depth of twenty thousand feet, for example. The casing is expensive and can represent more than one half million dollars, not counting the expense of installing the casing in the wellbore. For this and other reasons, the drilling companies will not run casing into the borehole until it has been "drifted"; that is, a selected size metal cylinder must freely slide through each section or joint of the pipe, whereupon the pipe sections are then pronounced as being drifted; that is, it has an acceptable or proper inside diameter. Often irregularities randomly occur on the inside wall surface of pipe sections that preclude the pipe from being acceptable for use in deep wells and this is referred as "undrifted pipe" or pipe that is too small to accept the drift. This undrifted pipe is perfectly good except that it cannot be used downhole in the borehole because the oil company must be assured that the entire borehole is of a minimum diameter, so that there is no subsequent danger of sticking a tool string or other devices, downhole in the borehole.

Applicant has discovered that the undrifted pipe can be reclaimed economically by running a cutterhead made in accordance with his invention through the pipe. The cutterhead, together with a considerable amount of support equipment, provides a method of drifting pipe so that the expensive undrifted casing can be reclaimed.

SUMMARY OF THE INVENTION

A cutterhead has a first and second radially active alignment means spaced axially from one another and mounted to rotatably receive a mandrel along the longitudinal axis thereof. A rotatable cutter device for removing metal from a pipe interior sidewall is mounted to be rotated by the mandrel. The cutter device is positioned between the first and second radially active alignment means. The cutter device and the first and second alignment means are positioned along a common axial centerline that coincides with the longitudinal axial centerline of the pipe section. The cutter device and the first and second alignment means are slidably received in a telescoping manner within the pipe section.

The cutter device includes a plurality of circumferentially spaced, radially adjustable, cutting tools, each having a shank that is adjustably received within a main body of the cutter device. Spacer means are selected and attached to the tools by which the effective diameter of the cutter device is selected, thereby enabling removal of sufficient material from the inside wall of the pipe to provide a predetermined minimum pipe diameter.

Each of the radially active alignment means includes a body member having at least three pistons received within a complementary cylinder, with the cylinders each being arranged radially respective to the longitudinal axis of the cutter device. The outer wall of the head of the piston receives a skid in removably attached relationship at the outer end thereof. Selected sizes of skids enable the alignment means to be used in drifting or working on a range of different pipe diameters. The selection of the configuration of the skids furthermore enables the central axis of the cutterhead to be positioned eccentrically or parallel to and spaced from the longitudinal axis of the pipe.

The cutterhead of this invention is used in conjunction with a system that includes a power shaft connected to rotate and axially move the mandrel. The cutterhead has a longitudinally extending axial passageway which delivers cutting fluid to the cutter device. The fluid returns back down through the pipe that is being processed, carrying the cuttings therewith.

The system includes apparatus for rotating the shaft and apparatus for moving the shaft along its longitudinal axis. The apparatus further includes lifting devices by which a pipe can be reversed to bring either of the opposite ends thereof into close proximity to the cutterhead.

A primary object of the present invention is the provision of a cutterhead assembly having radially active spaced, alignment means for rotatably receiving a mandrel and for rotating a cutter device that engages the inner peripheral wall surface of a pipe as the rotating cutting device is moved longitudinally along the pipe interior.

Another object of the present invention is the provision of method and apparatus for drifting a pipe section by utilizing a pair of alignment means having a cutter device located therebetween which engages the inner peripheral wall surface of a joint of pipe and removes material therefrom to thereby provide a constant diameter pipe.

A further object of this invention is the provision of a cutterhead for drifting pipe that includes a rotatable cutter device and a pair of spaced alignment means, each alignment means having radially active pistons therein for positioning the axis of the rotatable cutter device respective to the central axis of the pipe.

An additional object of this invention is the provision of a cutterhead for drifting pipe, wherein spaced alignment means have cylinders therein which reciprocatingly receive pistons therein, and wherein the pistons include skids mounted thereon for accommodating a range of inside diameter pipe.

An additional object of this invention is the provision of a method of removing irregularities from the inside surface of a pipe in order to improve the constant inside diameter thereof by the provision of apparatus that includes a cutterhead, along with various other equipment for drifting pipe, wherein the cutterhead has alignment members in the form of fluid actuated pistons that include skids mounted thereon for accommodating a range of different inside diameter pipe.

A further object of this invention is the provision of a cutterhead having a cutting apparatus associated therewith for removing irregularities from the inside of tubular sections of metal casing whereby the casing can be imparted with a minimum size inside diameter. The cutterhead includes spaced alignment means, each having radially active pistons for positioning the axis of the rotatable cutter apparatus respective to the central axis of the pipe.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 1 is a part schematical, part diagrammatical, broken, side elevational view of apparatus and method according to the present invention;

FIG. 2 is a broken, side elevational view of a prior art apparatus used for drifting pipe;

FIG. 3 is an enlarged, detailed, side elevational view of part of the apparatus disclosed in FIG. 1;

FIGS. 4, 5, and 6, respectively, are cross-sectional views taken along lines 4—4, 5—5 and 6—6, respectively of FIG. 3;

FIG. 9 is a disassembled, part cross-sectional view of FIG. 4;

FIG. 12 is a side elevational view of a system by which joints of pipe can be drifted according to the present invention;

FIG. 13 is a top, plan view of the system of FIG. 12;

FIG. 14 is an enlarged, part cross-sectional, end view of the apparatus disclosed in FIGS. 12 and 13; and, FIG. 15 sets forth a modification of part of the apparatus disclosed in FIGS. 6, 10 and 11.

DETAILED DESCRIPTION OF THE PREFERRED EMBODIMENT

Figure 7:
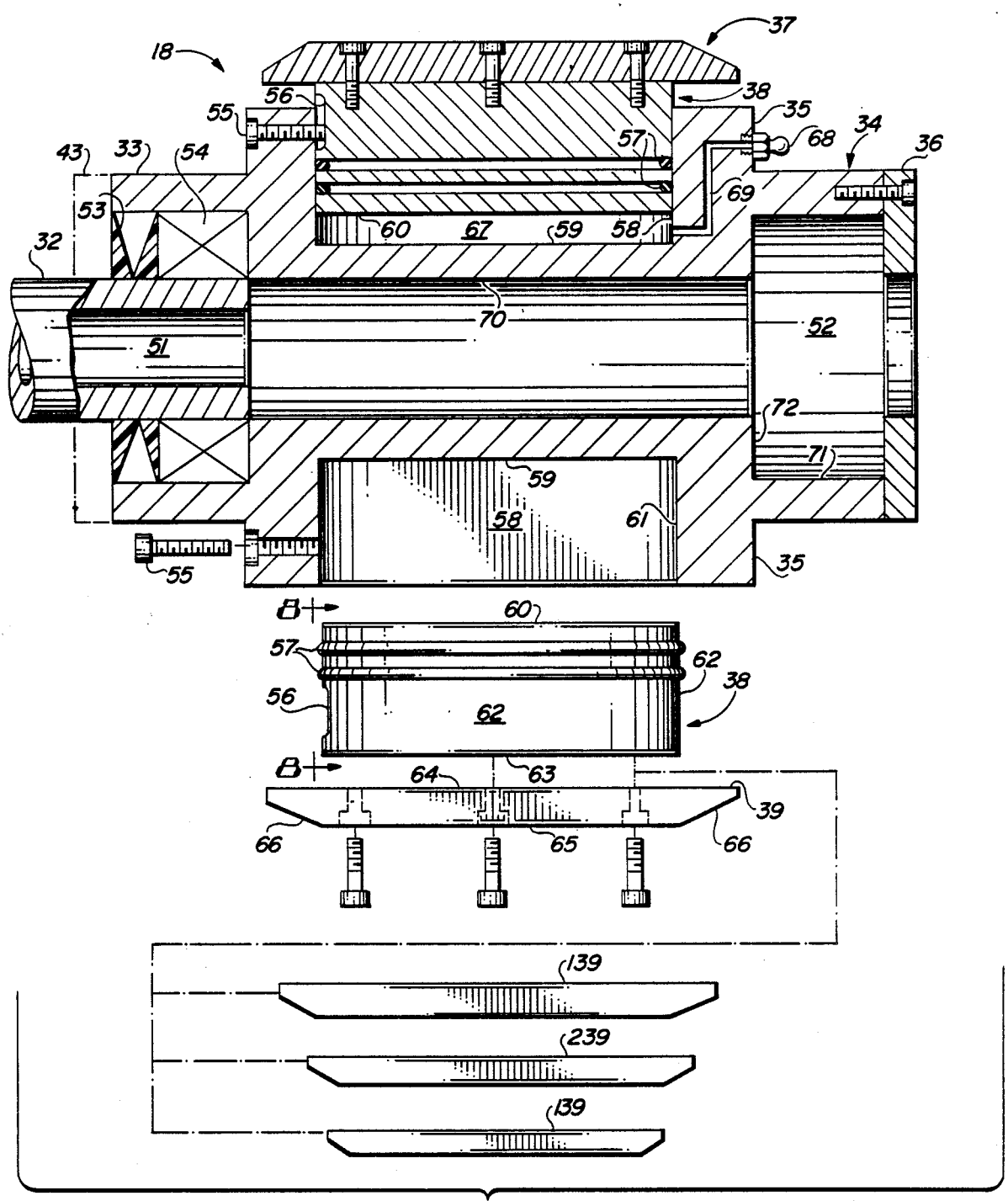
FIG. 7 is an enlarged, detailed, longitudinal, part cross-sectional, partly disassembled view of some of the apparatus disclosed in FIG. 3.

FIG. 1, together with other figures of the drawings, discloses a system 10 for cutting and removing irregularities from the inside surface area of a pipe 11 in order to render the inner surface of the pipe smoother and to impart the pipe with a minimum selected inside diameter throughout the length of the pipe and for adjusting the weight of the pipe. Numeral 12 is the Center of Gravity, or "CG" of the pipe.

A cutterhead 14, made in accordance with the present invention, extends into the interior of pipe 11 and is connected to a power unit 16 by means of a power shaft 17. The cutterhead assembly 14 includes a near or first alignment member 18, rotatably connected to shaft 17, a cutter device 19 and a far or second alignment member 20 that is more or less identical to the first alignment member 18.

Cradle 21 is positioned in a horizontal plane and is moved vertically by the illustrated hydraulic cylinder. Means are provided by which the entire cylinder can be rotated about its vertical axis to rotate pipe 11 one hundred eighty degrees. Clamp and alignment member 22 is removably attached to the pipe and is positioned vertically by hydraulic cylinder assembly 23. Clamp 22 prevents rotation of the pipe in reaction to rotation of shaft 17, and further prevents the pipe from moving along its longitudinal axis as shaft 17 reciprocates the cutterhead assembly 14 within the interior of the pipe, as will be more fully described later on.

Power unit 16 includes a motor 24 having power connection 25 and a power train 26. Swivel 27 translocates fluid flow from the fixed pump P into the hollow, rotatable power shaft 17. Cart 28 is guidably supported by track 29. Cables 30, 31 move the cart along track 29, thereby reciprocating power shaft 17 and consequently reciprocating the rotatable cutterhead assembly 14 within the interior of the pipe.

FIGS. 3 through 10, and particularly FIG. 3, disclose in greater detail the before mentioned alignment member 18, cutter device 19, and alignment member 20. The alignment members 18, 20 are identical to one another and each include a main body 33 of generally cylindrical configuration that is reduced in diameter at 34 to form a bearing housing at opposed ends thereof. A vertical face 35 is formed between the two cylindrical body parts 33, 34. An annular seal plate 36 is removably affixed to and forms a closure member at the outer end of the cylindrical body part 34, hereinafter called a bearing housing 34.

Numeral 37 indicates an oblated cylinder that is formed within main body 33 and is radially arranged respective to the central axis of mandrel 32. The longest dimension of the oblated cylinder is parallel to the longitudinal central axis of mandrel 32. The cylinder reciprocatingly receives a complementary fabricated oblated piston 38 in sealed relationship therewithin. The outer face of piston 38 supports a longitudinally arranged skid 39 in a removable manner thereon. There are a plurality of circumferentially spaced pistons and cylinders, and between each cylinder an outwardly opening cut-out 40 is formed so that a passageway exists through which fluid flow can occur across the main body 33 while it is working within the interior of the pipe.

A vertical face 41 is opposed to the vertical face 35, while bearing chamber 42 and seal plate 43 are opposed to similar components 34 and 36. Annular spacer 44 provides a bearing surface and separates alignment member 18 from the before mentioned cutter device 19 in the illustrated manner of the drawings.

The cutter device 19 has a reduced diameter marginal end 45 that terminates in low friction, abutting engagement with respect to spacer 44, and is integrally attached to a larger, main body portion 46 having opposed annular faces 47, 48. Another spacer 49, which can be identical to the before mentioned spacer 44, is interposed between the cutter device 19 and the second alignment member 20. An end cap 50 is attached to the terminal end of the hollow mandrel 32 and contains fluid within the passageway 51 of the hollow mandrel 32 (see FIG. 5).

In the detailed FIG. 7, interior 52 of bearing chamber 34 receives a thrust bearing 54 which can carry great loads in either axial direction. The bearing chamber also receives a seal 53, and both the seal 53 and the bearing 54 are held in assembled relationship by means of the before mentioned seal plates 36 and 43.

In FIGS. 7 and 9, a guide pin 55 extends into the main body and registers with groove 56 formed within the oval piston 38. O-rings 57 are properly fitted to the piston in order to seal the interface between the outer surface of piston 38 and the inner surface of cylinder 58. Numeral 59 indicates the bottom of the cylinder 58 while numeral 60 indicates the bottom of the piston 38. The cylinder sidewall 61 slidably receives the piston sidewall 62 in close tolerance and sealed relationship therewithin. Numeral 63 indicates the outer face of the piston 38 which can be extended to any desired diameter.

The before mentioned longitudinally extending skids 39 have an inner face 64 that abuts piston face 63 and is secured in the illustrated position by the illustrated fasteners. The skid has an outer face 65 for engaging the pipe interior, and the outer marginal ends thereof taper toward the inner face 64 as indicated by numeral 66 in FIG. 7.

Variable air chamber 67 is formed between the piston and the cylinder. Each air chamber communicates with an air check valve 68 by means of interconnecting air passageways 69. Numeral 70 indicates an axial bore in the main body that telescopingly receives the mandrel 32 therethrough, with the main body being rotatably journaled to the mandrel by means of the bearings 54 of the chambers 52.

Numeral 71 indicates the inner circumferentially extending wall surface that forms the bearing chamber. Annular wall 72 forms the inside end wall of the bearing chamber 52 and is formed between the axially aligned and spaced apart cylindrical wall surfaces 70, 71.

Figure 8:
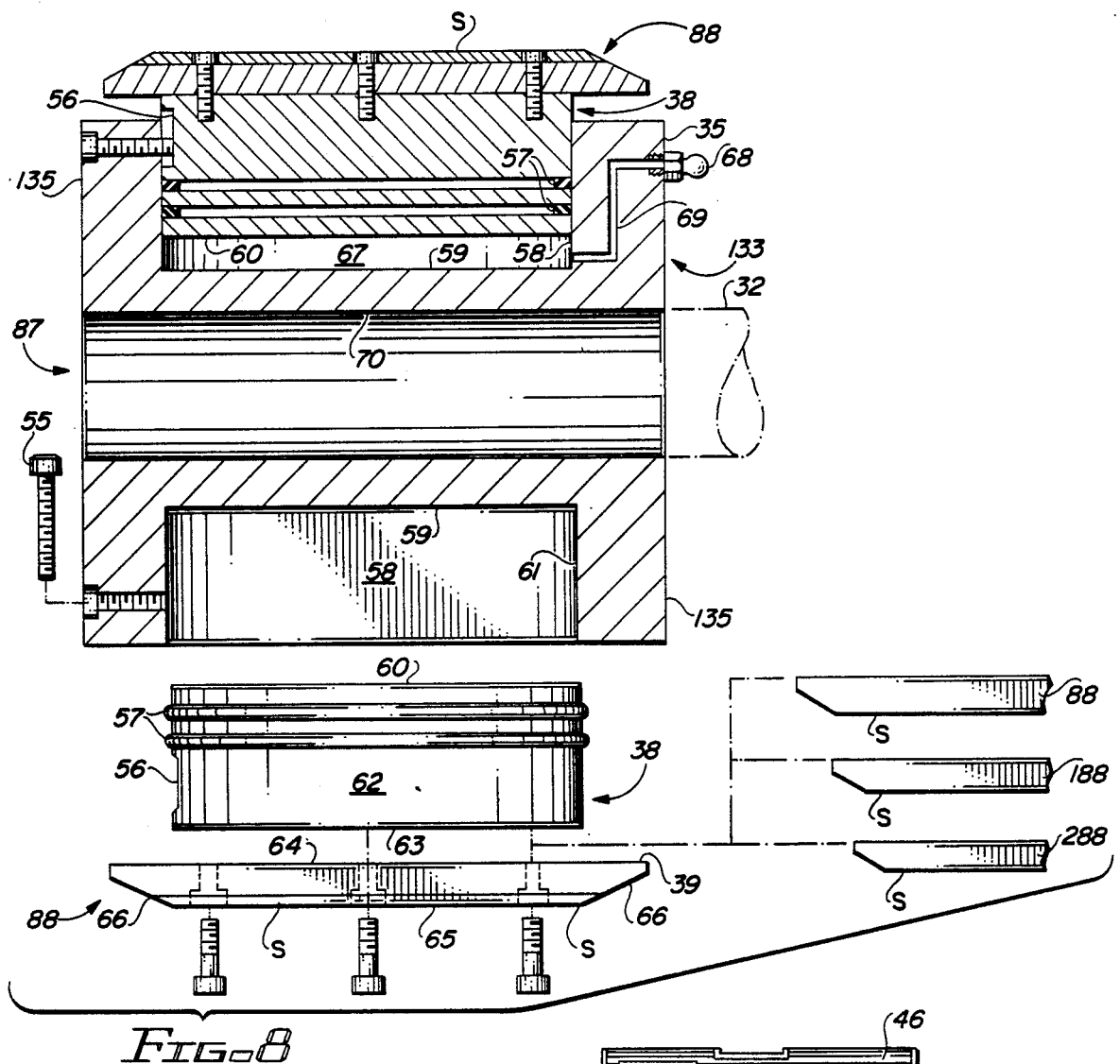
FIG. 8 is an end view of part of a modification of the apparatus disclosed in FIG. 7.

The detailed illustration of FIG. 8 discloses a pipe grinder 87 for grinding the interior of a pipe 11 (FIG. 1). The pipe grinder 87 includes a number of parts used in the before mentioned alignment member 18 of FIGS. 4, 5, 7, and 9. The grinder 87 includes a main body 133 of generally cylindrical configuration that is defined by opposed end walls 135. The main body 133 is directly attached in a rigid manner to mandrel 32.

In FIGS. 7 and 8, like numerals will refer to like or similar elements and it will be noted that the grinder 87 of FIG. 8 includes the oblated cylinder 58 that is formed within main body 133 and is radially arranged respective to the axis of the mandrel 32. The longest dimension of the oblated cylinder is parallel to the mandrel 32. The cylinder reciprocatingly receives a complementary fabricated oblated piston 38 in sealed relationship therewithin. The outer face of piston 38 supports a longitudinally arranged grinder 88 that is similar to the skid 39 of FIG. 7. There are a plurality of circumferentially spaced pistons and cylinders, and between each cylinder a passageway 40 may be formed if desired so that material can flow across main body 133 while it is working within the pipe.

Figure 10:
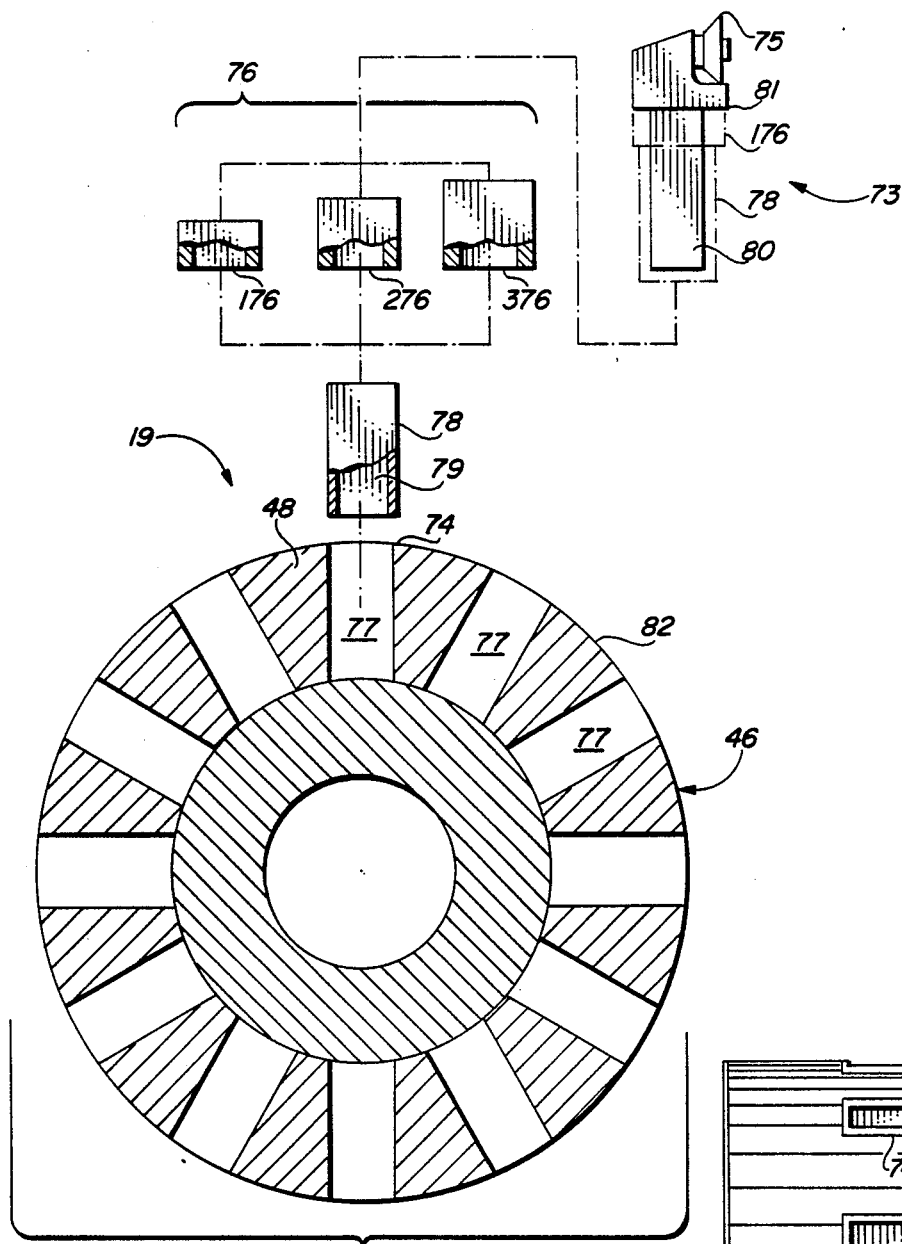
FIG. 10 is a detailed, part cross-sectional, disassembled view of part of the apparatus disclosed in FIGS. 1, 3, 4 and 6.
Figure 11:
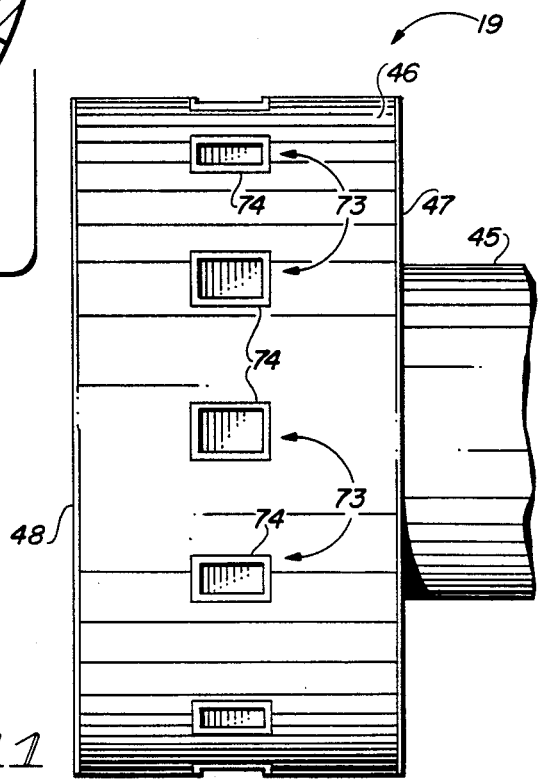
FIG. 11 is a broken, side elevational view of part of the apparatus disclosed in FIG. 1, 3, 4, 6 and 10.

In FIGS. 3, 6 and 10, the cutter device 19 is provided with a plurality of circumferentially extending cutter assemblies 73. Each of the cutter assemblies 73 is received within a square socket having opening 74 leading into the main body 46. Numeral 75 indicates the tip or cutting edge of a cutting implement, such as a carbide cutter, and a spacer 76 of different sizes as suggested at 76, 176, 276 and 376 is selected to be included in the cutter assembly 73. Cavity 77 receives the holder 78 in fixed relationship therewithin, with the interior 79 thereof being properly oriented respective to the main body 46 whereby the cutting action at 75 is precisely aligned with the interior surface of the pipe.

The passageways 77 and 79 are of square configuration, while the shank 80 of the cutter assembly 73 is made complementary respective to holder 78. Flats 82 are formed on the main body between passageways 77, with the outer end of holder 78 terminating in the flat plane. The central bore of the main body is rigidly attached to the mandrel with an interference fit. In FIG. 6, cutting oil outlet 83 is connected to passageway 51 by means of passageway 84 that is formed through the main body of the cutter device 19. Ports 85 provide a source for the flow of cutting oil from the hollow mandrel.

Figure 15:
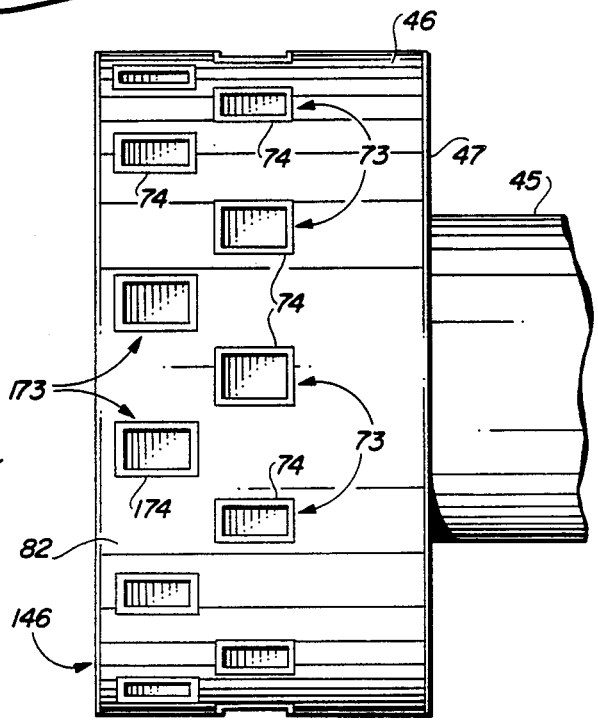

In FIG. 15, there is disclosed an alternate embodiment 119 of the cutter device 19, which is provided with a plurality of circumferentially extending cutter assemblies at 73 and 173. Each of the cutter assemblies 73 and 173 is received within one of the illustrated rows of square sockets, each of which has an opening 74 leading into the main body 146. Each socket receives a cutting implement 75, 80, 81 (FIG. 6), such as a carbide cutter, and a spacer 76 of various different sizes is included in the cutter assembly 73 in the before described manner. The rows of openings 74 and 174 lead into a cavity 77 which receive the holder 78 therewithin, with the interior 79 thereof being properly oriented respective to the main body, whereby the cutting action at the carbide tip 75 is precisely aligned with the interior surface of the pipe. There are passageways 77 and 79 of square configuration, and a shank 80 of the cutter assembly 73 which is made complementary respective to holder 78 and passageway 77, as in the before described manner of FIGS. 3, 6, 10, and 11. Flats 82 are also formed on the main body 82 with the end 79 of holder 78 terminating in the flat plane. A cutting oil outlet 83 is connected to mandrel passageway 51 by means of passageway 84 that is formed through the main body of cutter device 119. Ports 85 are included as shown in FIG. 6 that provide a source of cutting oil.

In operation, pipe racks 89 are placed laterally and longitudinally of the apparatus and in a position to admit pipe joints one at a time to the cutting head. The pipe is rolled onto the pipe rack, using prior art pipe racking expedients, whereupon the cradle 21 is elevated by the hydraulic cylinder to bring the medial part or C.G. of the pipe into proper horizontal position respective to the shaft 17. At the same time, the near end of the pipe 11 is clamped by utilizing any suitable clamping means 22, including a chain and boomer. The near end of the pipe 11 is similarly adjusted into axial alignment with respect to the cutterhead and power shaft.

The cutterhead assembly 14 is extended partially into the pipe and air pressure is applied to the far alignment member 20, by using an ordinary air chuck to apply pressure at the inlet check valve 68. The power shaft next slidably forces the cutterhead assembly further into the pipe interior, and the near alignment member 18 is similarly inflated. The cutting oil supply is applied to the interior of the mandrel 32. The mandrel 32 is now rotated at approximately 500 rpms, for a ten inch diameter joint of casing. The cart 28 is moved from the near end toward the far end of the pipe at a rate of three feet per minute until the mandrel has traveled through the approximate center of the joint of casing, which is approximately 20-23 feet in length. At that time, the cutterhead is returned to the near end of the pipe, the air chambers of the cutterhead are deflated, and the assembly is removed from the interior of the pipe. The clamp 22 is then released and the cradle 21 is elevated and rotated 180 degrees, thereby reversing the relationship of the casing. The casing is next returned into axial alignment respective to the cutterhead and again boomed down, whereupon, the other end of the casing interior is now resurfaced in the same before described manner, as may be required.

The cutting oil flows from ports 83 and is connected to radial passageway 84 and longitudinal passageway 51. The oil cools the tungsten carbide cutters 75 and at the same time washes the removed cuttings back toward the entrance of the pipe where the cutting oil is reclaimed at tank 86. The pump P circulates the oil through a suitable filter and returns the useable oil to the mandrel.

Occasionally, a joint of casing will be out of tolerance along one specific side of the entire sidewall. When this occurs, a relatively thicker skid 39 is attached to the appropriate piston, thereby arranging the axial centerline of the cutting apparatus along the desired true axial centerline of the joint of casing, so that the cutting action places the desired internal surface on the interior of the casing by predominantly cutting on a selected area of only one side of the casing.

The skids are of different thickness so that the effective diameter of the radially active pistons can be selected and used to align the cutters on a number of different diameter casings within a range of diameters. The skids are easily changed by removing the fastener means, and substituting one size skid for another.

The cutters 73 likewise must be carefully adjusted so that the cutting edge 75 thereof describes the desired inside diameter of the casing. This is achieved by utilizing different size spacers 76 to achieve the desired inside diameter of the casing or pipe.

Sufficient air pressure is maintained on the radially active alignment members 18 and 20, whereby the alignment members are held non-rotatable against the casing interior in reaction to the turning mandrel, and yet sufficient force is available through the power shaft to move the entire cutterhead assembly 14 as the cart 28 is forced toward or away from the pipe near end.

It is preferred to use an odd number of piston assemblies 38 in each of the alignment members. Three, five or seven piston and cylinder assemblies, equally spaced apart from one another, and in a common vertical plane, and radiating from a longitudinal central axis of the assembly 14 has proven satisfactory.

It is preferred to use nine cutters on the cutting member 19, with the cutters 73 being equally and circumferentially spaced apart from one another and laying along a radius from the axial centerline of the cutter apparatus 14.

The tungsten carbide cutting tool 75 must be precisely adjusted and properly oriented respective to the pipe inside surface in order to assure that each of the nine carbide cutters properly engage the interior pipe surface to thereby selectively remove adequate material therefrom.

In FIGS. 12 and 13, there is a pipe grinder 87 for grinding the interior of casing or pipe. The grinder 87 is arranged adjacent to the cutterhead 14, with the respective shafts thereof lying parallel to one another at 96 and 17. In grinding the interior of the pipe 11, small particles of metal are removed from the pipe interior and the grinding operation primarily is reserved for polishing the inside of the pipe or cleaning up very small irregularities in a joint of casing or pipe 11. The cutting operation, on the other hand, produces cuttings much like that obtained on an engine lathe when making a counterbore in a cylinder. The cuttings produced by the cutter device 19 are many times longer than the thickness thereof whereas the material removed by grinding with grinder 87 is an irregular piece of matter having fairly uniform dimensions.

The nine rotating cutting assemblies 73 of FIG. 3 produce cuttings of a size to pass through the outwardly, opening passageways 40 without clogging. The cutting assemblies 73, 173 in each of the parallel rows of FIG. 15 are staggered respective to one another. The embodiment of FIG. 15 is used to make a double cut in order to change the weight/foot of casing drastically.

The apparatus of the present invention provides a system for remanufacturing used and new joints of casing and other expensive oil field pipe so that the pipe is useful for its intended purpose. The apparatus is portable and can be set up on a pipe yard and the pipe reworked in the yard rather than undergoing the expense of transporting the pipe from here to there.

The method of the present invention provides a means by which pipe having irregular inside diameters is provided with an internal constant diameter that will accept a drift therethrough and thereby avoid the probability of anything getting stuck downhole when the casing is cemented in place as part of a wellbore.

I claim:

1. Apparatus for removing irregularities from the inside of a pipe section, said apparatus includes a cutterhead for cutting the inner wall surface along the length of a joint of pipe and thereby provide the joint with a minimum inside diameter, said cutterhead has a mandrel, said mandrel has an end which is adapted to be connected to a rotatable shaft which can be moved axially along the interior of the pipe;

a first and second alignment device spaced from one another and mounted on said mandrel, a cutter device connected to be rotated by said mandrel, means mounting the cutter device between the alignment devices;

each said alignment device comprises a main housing, means by which said main housing is journaled to said mandrel, and means forming radially active pistons which are reciprocatingly received within said main housing and can be extended into contact with the inner wall of the pipe; means on said pistons for engaging the inner pipe wall and thereby resist rotation of said main housing while permitting said cutterhead to be moved axially within the pipe.

2. The apparatus of claim 1 wherein each said alignment device includes at least three radially active pistons having a variable pneumatic chamber inflatable to a predetermined pressure to align the mandrel with respect to the longitudinal axis of the pipe.

3. The apparatus of claim 2 wherein said mandrel is hollow and conducts cutting fluid therethrough, said cutter device has cutters thereon for cutting the pipe, and means forming a passageway to the cutters of the cutterhead; a hollow shaft means connected to rotate said mandrel, and a swivel by which fluid flow is conducted into the shaft, into the mandrel, and to said cutters.

4. The apparatus of claim 3 wherein said cutter device is directly affixed to said mandrel and includes a plurality of radially arranged cutters adjustably positioned thereon for engaging and cutting the interior of the pipe.

5. The apparatus of claim 4 wherein spacers are included in said cutter device by which said cutters are radially extended selectively to provide a pipe section with a predetermined minimum diameter.

6. The apparatus of claim 1 wherein each said alignment device has at least three radially active pistons, said main body having means forming a pneumatic chamber therein which is inflatable to an elevated pressure to align the mandrel with the axis of the pipe;

a plurality of cutter assemblies on said cutterhead; said mandrel is hollow and includes passageway means which conduct cutting fluid to the cutters of the cutter device.

7. The apparatus of claim 6 wherein said cutter device is directly affixed to said mandrel and said plurality of cutters are radially arranged for engaging and cutting the inner surface of a section of pipe;

spacers by which said cutters are extended selectively to a predetermined diameter whereby a range of pipe diameters can be cut true by said cutterhead.

8. The apparatus of claim 1 and further including at least three radially active pistons and means forming a pneumatic chamber in said main body for each said piston, said chamber is inflatable to a selected elevated pressure to align the mandrel respective to the axis of the pipe section;

said cutter device is directly affixed to said mandrel and includes a first plurality of radially arranged cutters and a second plurality of radially arranged cutters for engaging and cutting pipe; said first and second plurality of cutters are spaced axially from one another;

said mandrel is hollow and includes passageway means which conduct cutting fluid to the cutters of the cutter device;

spacers by which said cutters are extended selectively to a predetermined diameter.

9. A system for drifting large casing comprising track means, a rotatable shaft, means for releasably securing a joint of casing in aligned relationship with said shaft, means for rotating said shaft, a cart, means moving said cart along said track means, one end of said shaft is supported respective to said cart;

a cutterhead for removing irregularities from the inside of a joint of casing, said cutterhead including a cutter device for cutting the inner wall of a joint of casing and thereby provide the joint with a minimum inside diameter, said cutterhead has a mandrel adapted to be connected to said rotatable shaft and said cutterhead is adapted to be moved axially along the interior of the casing;

a first and second alignment device spaced from one another and mounted on said mandrel, said cutter device is connected to be rotated by said mandrel, means mounting the cutter device between the first and second alignment devices and means mounting the cutter device on said mandrel, said cutter device, and said first and second alignment device having a common axial center line; a plurality of cutting elements on said cutter device;

each said alignment device comprises a main housing having means by which it is journaled to said mandrel, and cylinders that are radially aligned respective to the mandrel and are circumferentially arranged about the main housing; a radially active piston received within each cylinder, said piston can be extended into contact with the inner wall of the casing; means on said piston for engaging the interior wall of the casing;

passageway means for flowing cutting oil through said shaft, mandrel, cutter device, and to the cutting elements; and means forming a return flow path for the cutting oil to return from the cutterhead, through the casing interior, and to a location where the oil can be accumulated and reused;

means for rotating a casing joint 180 degrees to position either opposed end thereof adjacent to the shaft; whereby joints of casing are sequentially positioned in alignment with the cutterhead and the inner surface thereof engaged with the cutter device to provide a joint of casing of a minimum diameter.

10. The system of claim 9 wherein there are at least three radially active pistons having a pneumatic chamber inflatable to a predetermined pressure to align the mandrel with the axis of the casing.

11. The system of claim 9 wherein said passageway means conducts cutting fluid to the cutters of the cutter device by means of radial passageways that communicate the cutters with the interior of the mandrel.

12. The system of claim 9 wherein said cutter device is directly affixed to said mandrel and includes a first plurality of radially arranged cutters spaced from a second plurality of radially arranged cutters for engaging and cutting the interior surface from the inside of the casing.

13. The system of claim 9 wherein there are spacers by which said cutters are extended selectively to a predetermined diameter.

14. The system of claim 9 wherein there are at least three radially active pistons having a pneumatic chamber inflatable to a pressure to align the mandrel with the axis of the pipe;

check valve means for supplying pneumatic pressure to said pneumatic chambers; said passageway means extend from said mandrel and conducts cutting fluid through said cutter device and to the cutters of the cutterhead.

15. The system of claim 9 wherein said cutter device is directly affixed to said mandrel and includes a plurality of radially arranged cutter assemblies mounted thereon for engaging and cutting the inner surface of the casing;

and spacer means by which cutters are extended selectively to a predetermined diameter.

16. The system of claim 9 wherein there are at least three radially active pistons reciprocatingly received within said cylinders and forming a pneumatic chamber therewith, said chamber is inflatable to a predetermined or selected pressure to align the mandrel with the axis of the joint of casing;

said cutter device is directly affixed to said mandrel and includes a plurality of radially arranged cutters for engaging and cutting the interior of the joint of casing;

said mandrel is hollow, said passageway means conducts cutting fluid through the cutting device to the cutters of the cutterhead;
spacers by which said cutters are extended selectively to a predetermined diameter.

17. The system of claim 16 and further including a shaft operated grinder device having pneumatically actuated pistons to which a grinding surface is attached, whereby said pistons extend the grinding surface into contact with the casing interior.

18. The system of claim 17 wherein there are twin rows of cutters mounted on said cutter device, each having a plurality of cutter assemblies mounted to engage the inner surface of the casing and remove a predetermined amount of material therefrom.

19. A method for drifting large casing that can be used for casing a borehole comprising the steps of:
supporting a track means in aligned relationship with a shaft; releasably securing a joint of casing in aligned relationship with said shaft, rotating one end of said shaft by a motor mounted on a cart; and moving said cart along said track while one end of said shaft is supported to said cart on said track means;
connecting a cutterhead to the other end of said shaft wherein said cutterhead is arranged for removing irregularities from the inside of a joint of casing, including a plurality of cutter devices on said cutterhead;
cutting the inner wall of a joint of casing to thereby provide the joint of casing with a minimum inside diameter; providing said cutterhead with a mandrel adapted to be connected to said rotatable shaft and adapted to be moved axially along the interior of the casing by movement of said cart along said track;
mounting a first and a second alignment device, spaced from one another, on said mandrel; connecting said cutter device to be rotated by said mandrel; mounting the cutter device between the alignment devices; and arranging said cutter device and said first and second alignment device along a common axial center line;
forming cylinders within each said alignment device and arranging said cylinders in radially aligned relationship respective to the mandrel and circumferentially arranging said cylinders within said alignment device; reciprocatingly mounting a radially active piston within each cylinder; extending said pistons into contact with the inner wall of the casing and thereby engaging the interior wall of the casing;
flowing cutting oil through said shaft, mandrel, cutter device, and to the cutting elements; and forming a return flow path for the cutting oil to return from the cutterhead, through the casing interior, and to a location where the oil can be accumulated and reused;
moving said cart along said track whereby joints of casing are sequentially positioned in alignment with said cutterhead and the inner surface thereof engaged with the cutterhead to provide a casing section of a minimum diameter.

20. The method of claim 19 wherein there is provided at least three radially active piston having a pneumatic chamber inflatable to a selective pressure to align its mandrell with the alias of the casing.

21. The method of claim 19 and further including the step of making said mandrel hollow and conducting cutting fluid to the cutters of the cutterhead by means of passageways that communicate the cutters with the interior of the mandrel.

22. The method of claim 19 and further including the steps of directly affixing the cutter device to said mandrel, and arranging a first plurality of radially arranged cutters spaced from a second plurality of radially arranged cutters for engaging and cutting the interior surface from the inside of a casing.

23. The method of claim 19 wherein there are provided spacers by which said cutters are selectively extended to a predetermined diameter.

* * * * *